United States Patent
Hu et al.

(10) Patent No.: US 9,029,029 B2
(45) Date of Patent: May 12, 2015

(54) FUEL CELL SYSTEM AND METHOD OF CONTROLLING OPERATION OF A PLURALITY OF FUEL CELLS

(75) Inventors: Lei Hu, Suwon-si (KR); Young-Jae Kim, Suwon-si (KR); Hye-Jung Cho, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1243 days.

(21) Appl. No.: 12/732,434

(22) Filed: Mar. 26, 2010

(65) Prior Publication Data

US 2010/0248050 A1  Sep. 30, 2010

(30) Foreign Application Priority Data

Mar. 30, 2009  (KR) .................. 10-2009-0026952

(51) Int. Cl.
 *H01M 8/06* (2006.01)
 *H01M 8/04* (2006.01)

(52) U.S. Cl.
 CPC ........ *H01M 8/04626* (2013.01); *H01M 8/0494* (2013.01); *Y02E 60/50* (2013.01)

(58) Field of Classification Search
 USPC .......... 429/428, 400, 430, 431, 432, 422, 426
 See application file for complete search history.

(56) References Cited

U.S. PATENT DOCUMENTS

| 6,339,313 B1 * | 1/2002 | Adams et al. ................. 320/121 |
| 6,428,918 B1 * | 8/2002 | Fuglevand et al. ............ 429/431 |
| 6,858,335 B2 * | 2/2005 | Schmidt et al. ............... 429/430 |
| 7,449,259 B2 * | 11/2008 | Zhu et al. ..................... 429/422 |

* cited by examiner

*Primary Examiner* — Patrick Ryan
*Assistant Examiner* — Julian Anthony
(74) *Attorney, Agent, or Firm* — Lee & Morse, P.C.

(57) ABSTRACT

A fuel cell system, and a method of controlling an operation of a plurality of fuel cells. The fuel cell system controls the operation of the plurality of fuel cells according to a power consumed in a load and the performance of the plurality of fuel cells, thereby increasing a power conversion efficiency of the plurality of fuel cells while preventing considerable performance degradation of the plurality of fuel cells. The fuel cell system includes: a plurality of fuel cells; a control unit controlling an operation of the plurality of fuel cells according to a power consumed in a load and the performance of the plurality of fuel cells; and a converter converting a power output by at least one of the plurality of fuel cells into a power according to the control of the control unit.

7 Claims, 7 Drawing Sheets

US 9,029,029 B2

FUEL CELL SYSTEM AND METHOD OF CONTROLLING OPERATION OF A PLURALITY OF FUEL CELLS

CROSS-REFERENCE TO RELATED APPLICATIONS

This application claims the benefit of Korean Patent Application No. 10-2009-0026952, filed Mar. 30, 2009, in the Korean Intellectual Property Office, the disclosure of which is incorporated herein by reference.

BACKGROUND

1. Field

Aspects of the present invention relate to a fuel cell system and a method of controlling an operation of a plurality of fuel cells.

2. Description of the Related Art

Fuel cells are based on environment-friendly alternative energy technology for generating electrical energy from a material, such as hydrogen. In general, the fuel cells have a stack structure including a plurality of cells generating power. Generally, the number of cells forming the fuel cell is increased or an area of the cells is enlarged in order to increase the power generated by a fuel cell. When the size of the fuel cell is increased, the fuel supply capacity of a balance of plant (BOP) for operating the fuel cell is also increased so that power consumption of the BOP is significantly increased. In the case where many cells are used in the fuel cell, if the performance of some of the cells degrades, the whole stack of cells is replaced. Thus, research is actively being conducted on a fuel cell system employing a plurality of fuel cells.

SUMMARY

Aspects of the present invention include a fuel cell system and a method of controlling an operation of a plurality of fuel cells whereby a power conversion efficiency of the plurality of fuel cells is increased and, simultaneously, considerable performance degradation of the plurality of fuel cells is prevented.

Aspects of the present invention provide a fuel cell system including a plurality of fuel cells; a control unit controlling an operation of the plurality of fuel cells according to a power consumed in a load and the performance of the plurality of fuel cells; and a converter converting a power of the plurality of fuel cells into a power according to the control of the control unit.

Aspects of the present invention provide a method of controlling an operation of a plurality of fuel cells including comparing a power consumed in a load with a power to be output from at least one of the plurality of fuel cells; selecting an operational mode from among a plurality of operational modes operating the at least one of the plurality of fuel cells according to a result of the comparing of the power consumed; and controlling the operation of the plurality of fuel cells according to the selected operational mode.

According to another aspect of the present invention, a computer readable recording medium includes a program for executing the method of controlling the operation of the plurality of fuel cells.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
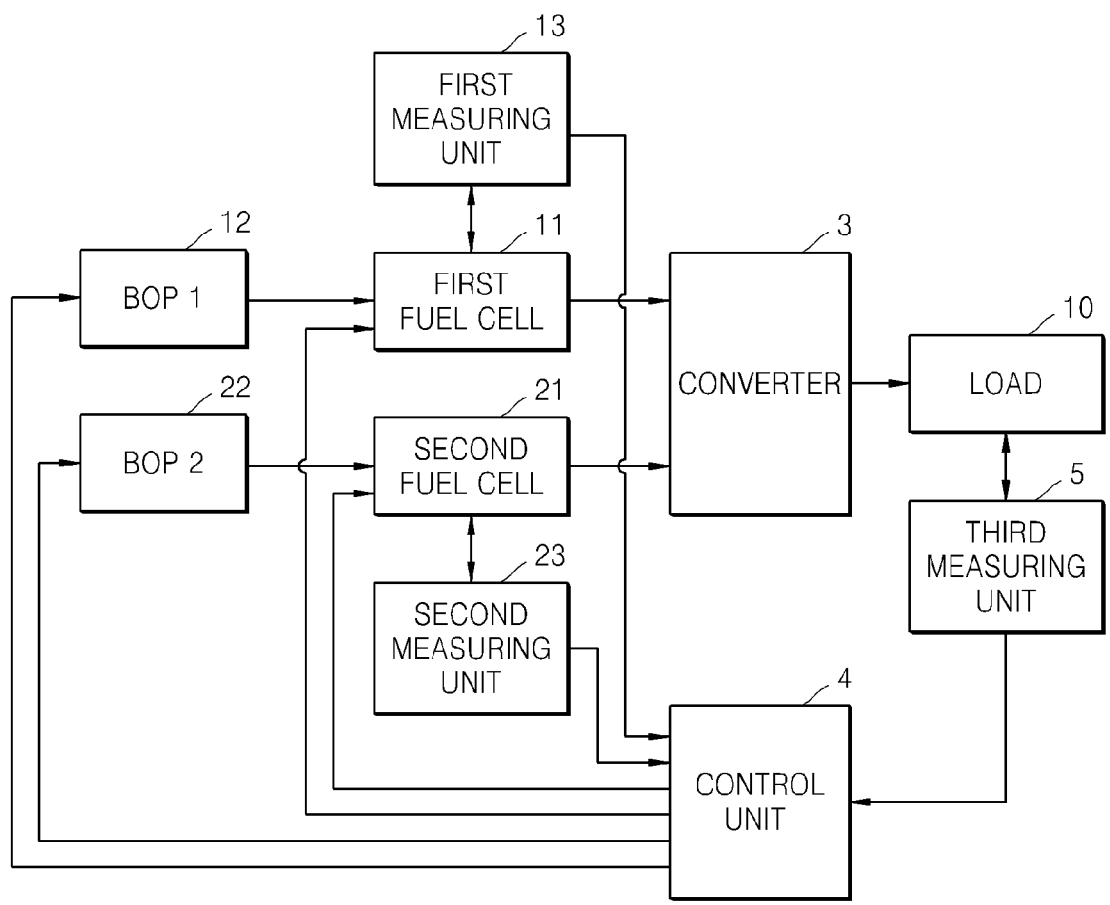
FIG. 1 is a block diagram of a fuel cell system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a fuel cell system according to an embodiment of the present invention. Referring to FIG. 1, the fuel cell system according the present embodiment includes a first fuel cell 11, a first balance of plant (BOP) 12, a first measuring unit 13, a second fuel cell 21, a second BOP 22, a second measuring unit 23, a converter 3, a control unit 4, and a third measuring unit 5. For convenience of description, the fuel cell system according to the present embodiment includes two fuel cells that are the first and second fuel cells 11 and 21, however, aspects of the present invention are not limited thereto and thus the fuel cell system may include three or more fuel cells.

Each of the first fuel cell 11 and the second fuel cell 21 is a power generating apparatus producing direct current (DC) power by converting chemical energy of fuel into DC power by using an electrochemical reaction. Examples of such a fuel cell include a solid oxide fuel cell (SOFC), a polymer electrolyte membrane fuel cell (PEMFC), a direct methanol fuel cell (DMFC), or other similar fuel cells.

The fuel cell has a stack structure in which a plurality of cells generating power are stacked. The plurality of cells are either connected in parallel so as to obtain a relatively high voltage or connected in series so as to obtain a relatively high current. Thus, a current and a voltage output from the fuel cell indicate a current and a voltage output from the fuel cell stack. Hereinafter, for convenience of description, the current and the voltage output from the stack of the fuel cell are referred to as 'the current and the voltage output from the fuel cell'. Also, one of ordinary skill in the art would understand that not only the fuel cell but also an electrical cell generating DC power and having a similar form to the fuel cell may be used. Thus, aspects of the present invention are not limited to a fuel cell and may include other similar cells generating DC power.

The first BOP 12 includes peripheral devices to operate the first fuel cell 11 and includes a pump (not shown) to supply fuel to the first fuel cell 11, and another pump (not shown) to supply air or oxygen to the first fuel cell 11 so as to oxidize the fuel. The second BOP 22 includes peripheral devices to operate the second fuel cell 21. When the fuel cell system of FIG. 1 initially starts, the first BOP 12 and the second BOP 22 are driven by power supplied from a battery (not shown) and a large-capacity capacitor (not shown), which are separately included in the fuel cell system, or by power that is supplied from an external source of the fuel cell system. A constant DC power output when operating the first fuel cell 11 and the second fuel cell 21 drives the first fuel cell 11 and the second fuel cell 21.

The first measuring unit 13 measures a present voltage and current of the first fuel cell 11. The second measuring unit 23 measures a present voltage and current of the second fuel cell 21. The third measuring unit 5 measures a present voltage and current of a load 10.

The control unit 4 detects power consumed in the load 10 and the performance of each of the first fuel cell 11 and the second fuel cell 21 according to values of the voltage and current respectively measured by the first measuring unit 13, the second measuring unit 23, and the third measuring unit 5. Then, based on results of the detection, the control unit 4 controls an operation of each of the first fuel cell 11 and the second fuel cell 21.

The converter 3 partially or completely converts the power of the first fuel cell 11 and the power of the second fuel cell 21 into a power according to the control unit 4. According to the power consumed in the load 10 and the performance of each of the first fuel cell 11 and the second fuel cell 21, the power of both the first fuel cell 11 and the second fuel cell 21 is supplied to the load 10, or a portion of the power of both the first fuel cell 11 and the second fuel cell 21 is supplied to the load 10. According to the control by the control unit 4, the converter 3 outputs the power having a voltage in a tolerance range.

Figure 2:
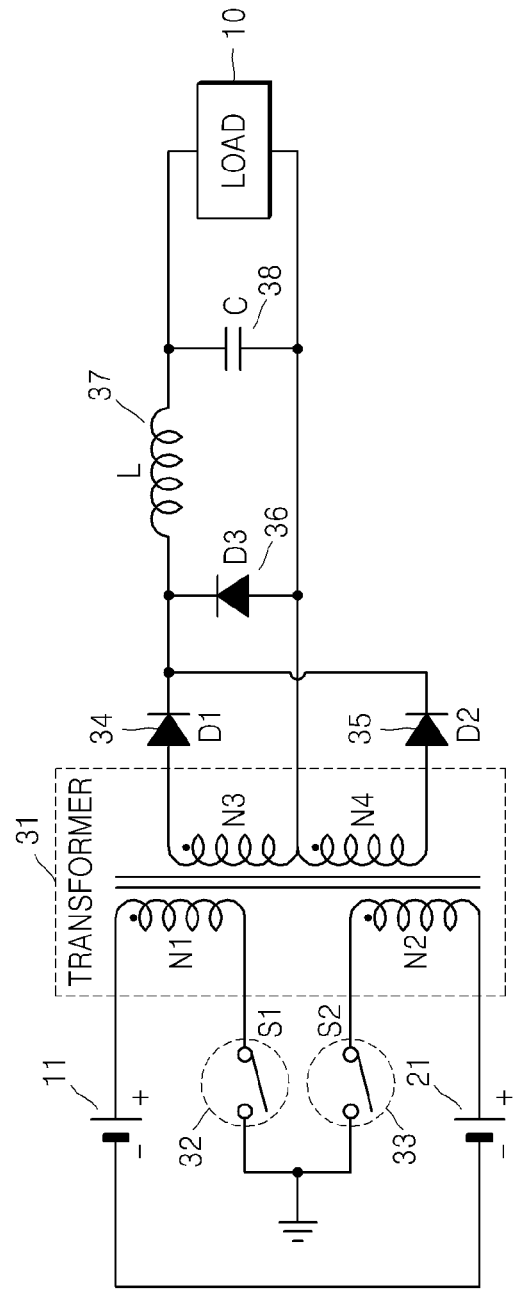
FIG. 2 illustrates an internal circuit diagram of a converter included in the fuel cell system of FIG. 1 and a load of FIG. 1.

FIG. 2 illustrates an internal circuit diagram of the converter 3 of FIG. 1. The converter 3 includes a transformer 31, a first switch 32, a second switch 33, a first diode 34, a second diode 35, a third diode 36, an inductor 37, and a capacitor 38. The first switch 32 and the second switch 33 are switching transistors that are activated or deactivated according to an activation/deactivation control signal input to each gate of the switching transistors.

The converter 3 of FIG. 2 is a DC-DC converter that converts the voltage of any of the first fuel cell 11 and the second fuel cell 21 into a voltage according to the control of the control unit 4. The DC-DC converter is a DC-DC converter without a transformer and a DC-DC converter with a transformer. Examples of the DC-DC converter without a transformer are a buck converter, a boost converter, a buck/boost converter, or the like, and examples of the DC-DC converter with a transformer are a flyback converter, a forward converter, a push-pull converter, or the like.

Referring to FIG. 2, an upper primary winding L1 and an upper secondary winding L3 of the transformer 31, the first diode 34, the third diode 36, the inductor 37 and the capacitor 38 form a forward converter. Also, a lower primary winding L2 and a lower secondary winding L4 of the transformer 31, the second diode 35, the third diode 36, the inductor 37 and the capacitor 38 form another forward converter. The forward converter couples a transformer to the buck converter in order to perform voltage conversion causing galvanic isolation between an input and an output of the DC-DC converter. In this manner, in the fuel cell system according to the embodiment of FIGS. 1 and 2, the first fuel cell 11 and the second fuel cell 21 are respectively connected to the upper primary winding L1 and the lower primary winding L2 of the transformer 31, and a DC-DC converter is commonly connected to the upper secondary winding L3 and the lower secondary winding L4 of the transformer 31, so as to not employ respective DC-DC converters for the first fuel cell 11 and the second fuel cell 21. That is, it is possible to implement the fuel cell system capable of managing a plurality of fuel cells using a simple circuit.

Hereinafter, a voltage conversion procedure performed by the converter 3 with respect to the first fuel cell 11 will now be described. When the first switch 32 is turned on, a current output from the first fuel cell 11 flows in the upper primary winding L1 of the transformer 31, and a current corresponding to the turns ratio of the upper primary winding L1 and the upper secondary winding L3 of the transformer 31 flows in the upper secondary winding L3 of the transformer 31 according to electromagnetic induction. The current output from the upper secondary winding L3 of the transformer 31 flows in the first diode 34, the inductor 37, the capacitor 38, and the load 10. In this manner, an energy stored in the first fuel cell 11 is delivered to the inductor 37, the capacitor 38, and the load 10. At this time, since the second diode 35 is reversely biased with respect to the current flowing in the upper primary winding L1 of the transformer 31, a current does not flow in the second diode 35.

When the first switch 32 is turned off, the current flowing in the upper primary winding L1 and the upper secondary winding L3 of the transformer 31 is dissipated. However, since the inductor 37 tends to maintain a previous flow of the current, a current of the inductor 37 corresponding to an on-state of the first switch 32 flows in the inductor 37, the capacitor 38, and the load 10 via the third diode 36. At this time, since the first diode 34 is reversely biased with respect to the current flowing in the third diode 36, a current does not flow in the first diode 34. In this manner, an energy stored in the inductor 37 and the capacitor 38 corresponding to the on-state of the first switch 32 is delivered to the load 10 connected to both ends of the capacitor 38, and thus is gradually dissipated. At this time, since the capacitor 38 tends to maintain a previous voltage, a voltage across the ends of the capacitor 38, that is, a voltage of the load 10 is gradually reduced. In the case where the first switch 32 is turned on after the voltage of the load 10 is slightly reduced, that is, a switching frequency of the first switch 32 is sufficiently short, then the voltage of the load 10 is constantly maintained and is nearly without a ripple.

According to the aforementioned voltage conversion procedure, a ratio of an input voltage to an output voltage of an ideal forward converter connected to the first fuel cell 11 is given by Equation 1.

$$\frac{V0}{V1} = D1\frac{N3}{N1} \qquad \text{Equation 1}$$

where V1 is an input voltage from the first fuel cell 11 to the converter 3. In other words, V1 is a voltage input to the upper primary winding L1 of the transformer 31, and V0 is an output voltage from the DC-DC converter, that is, V0 is a voltage across the ends of the capacitor 38. D1 is a duty ratio of the first switch 32, or in other words, a ratio of an ON-period to a total period in which the first switch 32 is turned on and off. N1 indicates the number of turns of the upper primary winding L1 of the transformer 31, and N3 indicates the number of turns of the upper secondary winding L3 of the transformer 31.

Similarly, a ratio of an input voltage to an output voltage of an ideal forward converter connected to the second fuel cell 21 is given by Equation 2.

$$\frac{V0}{V2} = D2\frac{N4}{N2} \qquad \text{Equation 2}$$

where V2 is an input voltage from the second fuel cell 21 to the converter 3, that is, V2 is a voltage input to the lower primary winding L2 of the transformer 31, and V0 is an output voltage from the DC-DC converter, that is, V0 indicates a voltage applied across the ends of the capacitor 38. D2 is a duty ratio of the second switch 33, or in other words, a ratio of an ON-period to a total period in which the second switch 33 is turned on and off. N2 is the number of turns of the lower primary winding L2 of the transformer 31, and N4 is the number of turns of the lower secondary winding L4 of the transformer 31. Since the forward converter is well known to one of ordinary skill in the art, a detailed description thereof is omitted here. Also, one of ordinary skill in the art would understand that the converter 3 of FIG. 1 may be embodied by using by using other types of converters such as the flyback converter, or other like converters.

In order to obtain power from each of the first fuel cell 11 and the second fuel cell 21 according to the power consumed in the load 10 and the performance of each of the first fuel cell 11 and the second fuel cell 21, the fuel cell system, according to the embodiment of FIG. 1, provides three configuration types with respect to DC-DC conversion performed by the converter 3 of FIG. 2. The control unit 4 controls the DC-DC conversion to be performed by the converter 3 according to a type from among the three configuration types (hereinafter, referred to as 'the first, second, and third configuration types').

Figure 3A:
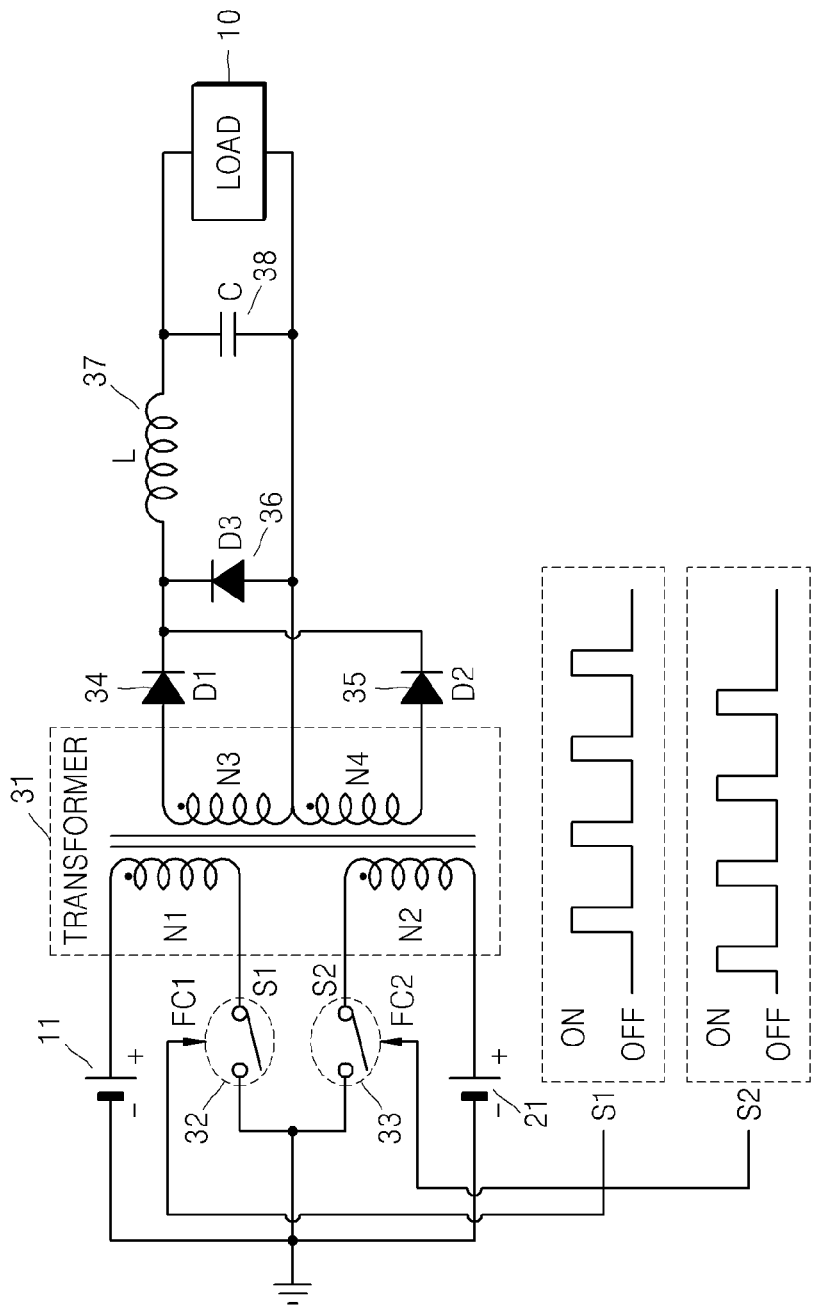
FIGS. 3A through 3C are diagrams of configuration types with respect to the DC-DC conversion performed by the converter of FIG. 2.

FIG. 3A is a diagram of the first configuration type with respect to the DC-DC conversion performed by the converter 3 of FIG. 2. In order to control the DC-DC conversion to be performed by the converter 3 according to the first configuration type, the control unit 4 outputs a pulse train to the first switch 32, wherein the pulse train periodically repeats an on-off of the first switch 32 for opening and closing a connection between the first fuel cell 11 and the converter 3, and outputs a pulse train the second switch 33, wherein the pulse train periodically repeats an on-off of the second switch 33 for opening and closing a connection between the second fuel cell 21 and the converter 3. The on-off of first switch 32 is periodically repeated according to the pulse train received from the control unit 4, and the on-off of the second switch 33 is periodically repeated according to the pulse train received from the control unit 4.

In order to prevent an output voltage of the first fuel cell 11 and an output voltage of the second fuel cell 21 from being added together and input to the converter 3, the pulse train output to the first switch 32 and the pulse train output to the second switch 33 have a same duty ratio less than 50%, and have a 180 degree phase difference from each other. A pulse width of the pulse train output to the first switch 32 and a pulse width of the pulse train output to the second switch 33 are adjusted according to the power consumed in the load 10 and the performance of each of the first fuel cell 11 and the second fuel cell 21. For example, in the case where increased power is consumed in the load 10, the pulse width of the pulse train output to the first switch 32 and the pulse width of the pulse train output to the second switch 33 are adjusted by being widened. The widening of the pulse width is applied to the second and third configuration types that will now be described.

Figure 3B:
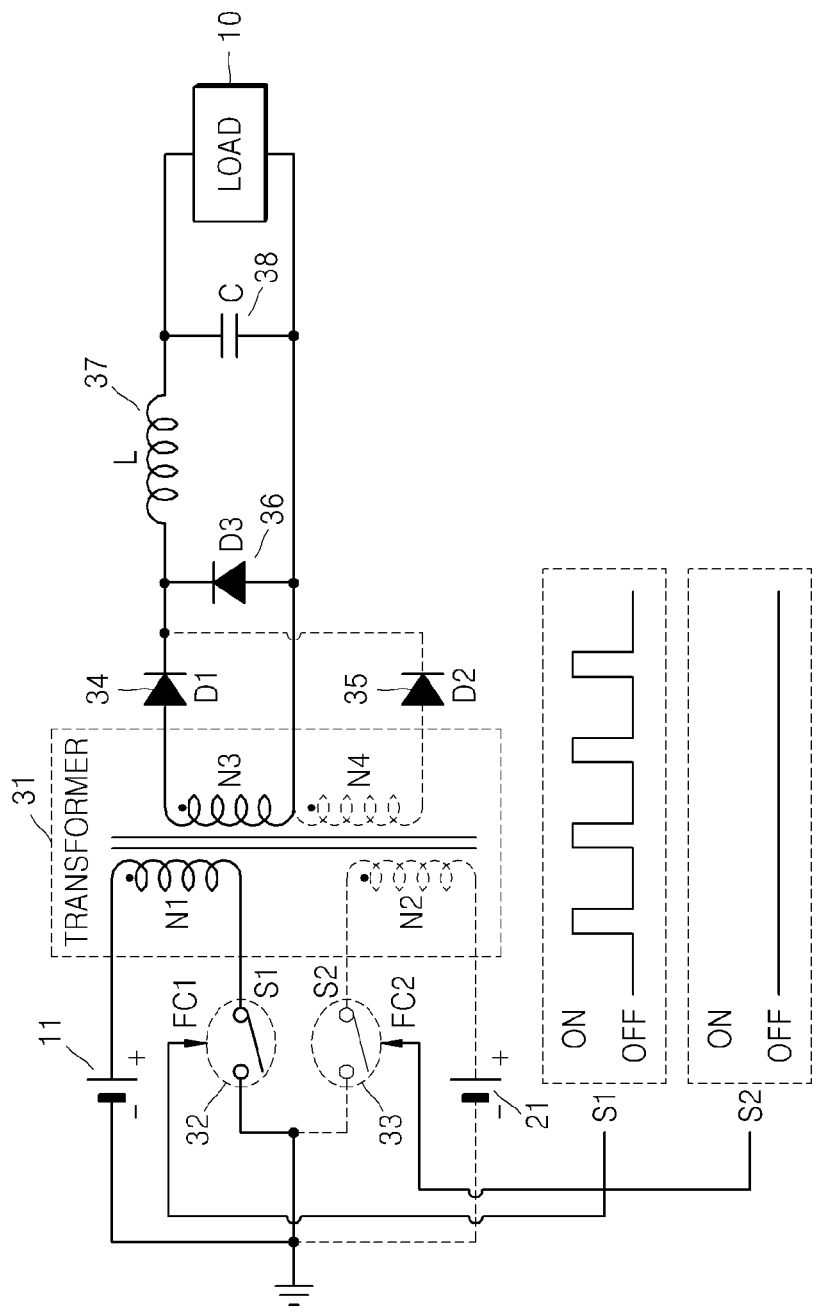

FIG. 3B is a diagram of the second configuration type with respect to the DC-DC conversion performed by the converter 3 of FIG. 2. In order to control the DC-DC conversion to be performed by the converter 3 according to the second configuration type, the control unit 4 outputs to the first switch 32 a pulse train periodically repeating the on-off of the first switch 32. The control unit 4 also outputs to the second switch 33 a flat line signal constantly maintaining an off state of the second switch 33. The on-off of the first switch 32 is periodically repeated according to the pulse train received from the control unit 4 and the off state of the second switch 33 is constantly maintained according to the flat line signal received from the control unit 4.

Figure 3C:
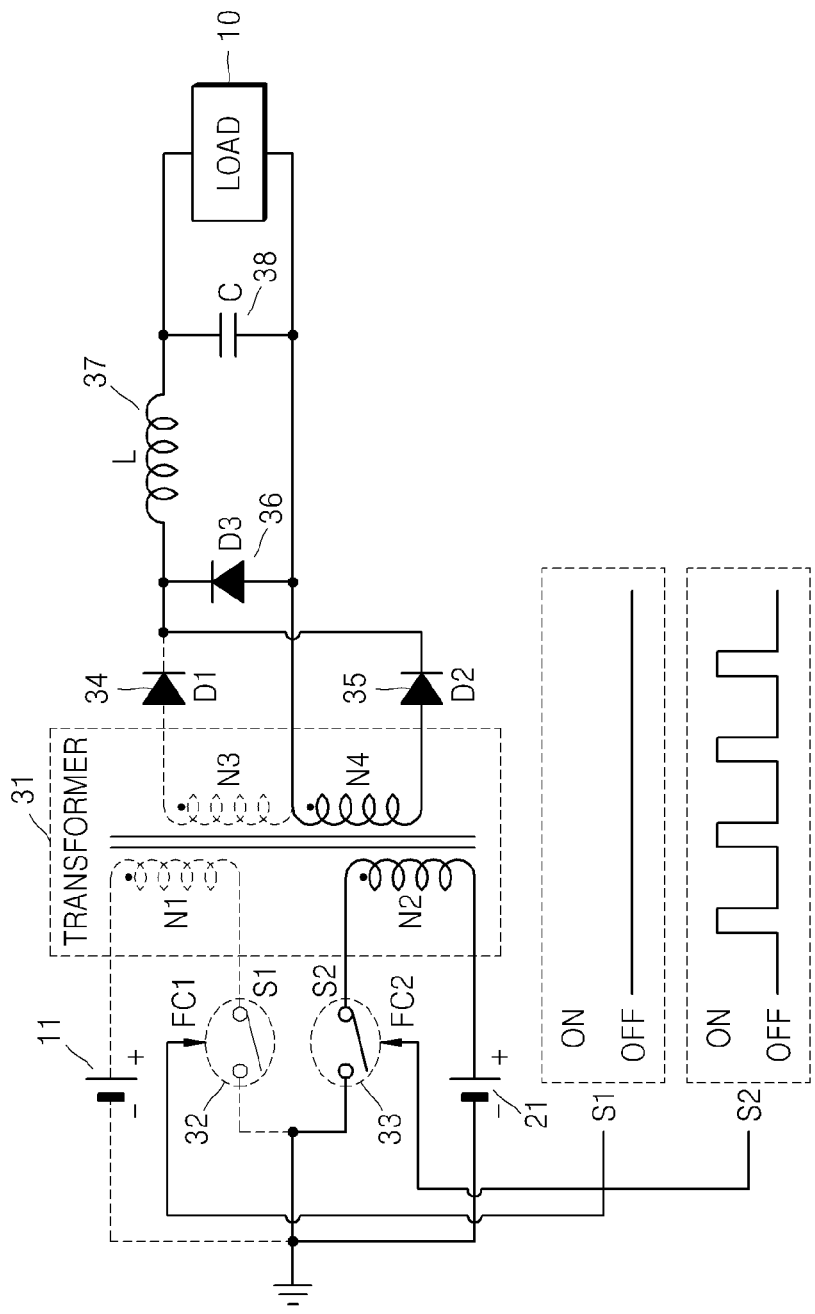

FIG. 3C is a diagram of the third configuration type with respect to the DC-DC conversion performed by the converter 3 of FIG. 2. In order to control the DC-DC conversion to be performed by the converter 3 according to the third configuration type, the control unit 4 outputs to the first switch 32 a flat line signal constantly maintaining an off state of the first switch 32. Also, the control unit 4 outputs to the second switch 33 a pulse train periodically repeating the on-off of the second switch 33. The off-state of the first switch 32 is constantly maintained according to the flat line signal received from the control unit 4 and the on-off of the second switch 33 is periodically repeated according to the pulse train received from the control unit 4.

The fuel cell system according to the embodiment of FIG. 1 provides various operational modes for indicating an operation of at least one of the first fuel cell 11 and the second fuel cell 21 according to the three configuration types of the converter 3. However, aspects of the present invention are not limited thereto, and there may be more than two fuel cells and more than three configuration types. The control unit 4 selects an operational mode from among the various operational modes for indicating the operation of at least one of the first fuel cell 11 and the second fuel cell 21 according to the power consumed in the load 10 and the performance of each of the first fuel cell 11 and the second fuel cell 21, and controls the operation of each of the first fuel cell 11 and the second fuel cell 21 according to the selected operational mode.

The various operational modes with respect to the first fuel cell 11 and the second fuel cell 21 include a full mode, a half mode, and an alternate mode. The full mode indicates the operation of both the first fuel cell 11 and the second fuel cell 21. The half mode indicates the operation of either the first fuel cell 11 or the second fuel cell 21. The alternate mode indicates that at least two operational modes from among the various operational modes are to be performed in an alternate manner. According to which operational mode is selected from among the various operational modes, the control unit 4 operates either one or both of the first BOP 12 connected to the first fuel cell 11 and the second BOP 22 connected to the second fuel cell 21, and thus reduces power consumed by the first BOP 12 and the second BOP 22.

When the full mode is selected so that both the first fuel cell 11 and the second fuel cell 21 are operated, the control unit 4 outputs a control signal according to the first configuration type to the converter 3. At this time, for the operation of both the first fuel cell 11 and the second fuel cell 21, the control unit 4 simultaneously operates the first BOP 12 connected to the first fuel cell 11 and the second BOP 22 connected to the second fuel cell 21. The full mode is selected when the power consumed in the load 10 is larger than an initial maximum power of either the first fuel cell 11 or the second fuel cell 21. The initial maximum power is a power to be output from either the first fuel cell 11 or the second fuel cell 21, or other fuel cells. In this manner, since the power of both the first fuel cell 11 and the second fuel cell 21 is delivered to the load 10 in the full mode, the fuel cell system provides a maximum power to the load 10.

When the first half mode so that only the first fuel cell 11 is operated, the control unit 4 outputs a control signal according to the second configuration type to the converter 3. At this time, for the operation of only the first fuel cell 11, the control unit 4 operates only the first BOP 12. When the second half mode indicating the operation of only the second fuel cell 21 is selected, the control unit 4 outputs a control signal according to the third configuration type to the converter 3. At this time, for the operation of only the second fuel cell 21, the control unit 4 only operates the second BOP 22 connected to the second fuel cell 21. The half mode is selected when the power consumed in the load 10 is not larger than the initial maximum power of either the first fuel cell 11 or the second fuel cell 21. In this manner, since either the first fuel cell 11 or the second fuel cell 21 is not operated in the half mode, a lifetime of the first fuel cell 11 and the second fuel cell 21 is extended and the power consumed in the first BOP 12 and the second BOP 22 is reduced.

When the alternate mode is selected so that at least two operational modes are performed in an alternate manner, the control unit 4 alternately outputs control signals according to at least two configuration types from among the three configuration types to the converter 3. The alternate mode includes a first alternate mode, a second alternate mode, a third alternate mode, and a fourth alternate mode.

When the first alternate mode is selected so that the full mode and the first half mode are to be performed alternately, the control unit 4 alternately outputs the control signal according to the first configuration type and the control signal according to the second configuration type to the converter 3. The first alternate mode is selected when the performance of the first fuel cell 11 excels that of the second fuel cell 21. When the second alternate mode is selected to indicate that the full mode and the second half mode are to be performed alternately, the control unit 4 alternately outputs the control signal according to the first configuration type and the control signal according to the third configuration type to the converter 3. The second alternate mode is selected when the performance of the second fuel cell 21 exceeds that of the first fuel cell 11.

When the third alternate mode is selected so that the first half mode and the second half mode are to be performed alternately, the control unit 4 alternately outputs the control signal according to the second configuration type and the control signal according to the third configuration type to the converter 3. In the third alternate mode, the duty ratio of the first switch 32 connected to the first fuel cell 11, and the duty ratio of the second switch 33 connected to the second fuel cell 21 is adjusted according to the performance of the first fuel cell 11 and the second fuel cell 21. When a duty ratio of a fuel cell is higher than that of another fuel cell, the amount of a power obtained from the fuel cell increases.

When the fourth alternate mode is selected to indicate that the full mode, the first half mode, and the second half mode are to be performed alternately, the control unit 4 alternately outputs the control signal according to the first configuration type, the second configuration type, and the third configuration type to the converter 3. In the alternate mode, although operational rates of the first fuel cell 11 and the second fuel cell 21 are different from each other, both the first fuel cell 11 and the second fuel cell 21 are kept in an operational state. Thus, the control unit 4 simultaneously operates the first BOP 12 connected to the first fuel cell 11 and the second BOP 22 connected to the second fuel cell 21. In this manner, in the alternate mode, the first fuel cell 11 and the second fuel cell 21 are operated according to the different operational rates while remaining in the operational state so that a difference between the performance of the first fuel cell 11 and the performance of the second fuel cell 21 is overcome. Also, in this manner, a maximum power is obtained from the first fuel cell 11 and the second fuel cell 21.

Figure 4:
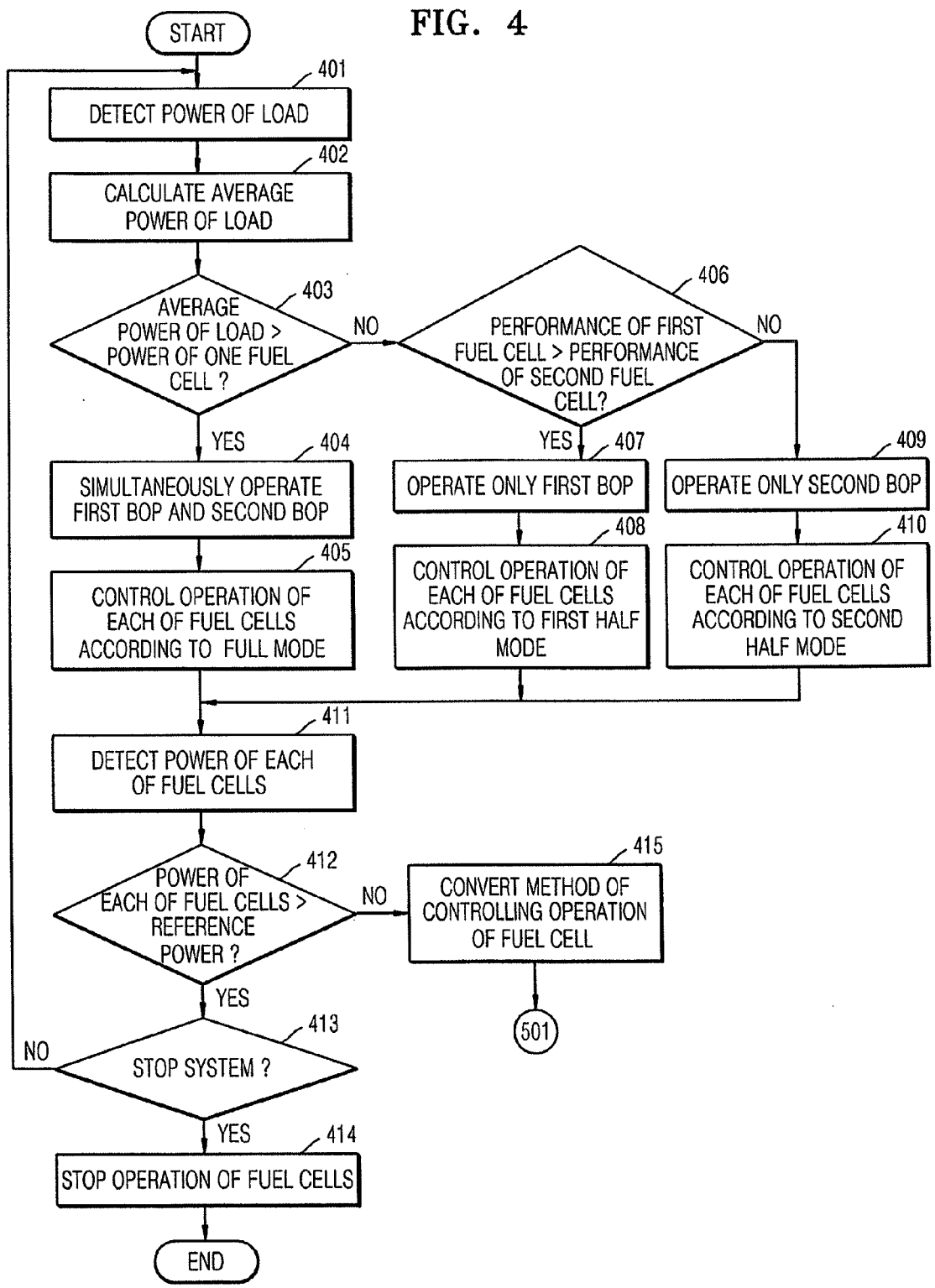
FIGS. 4 and 5 are flowcharts of methods of controlling an operation of a plurality of fuel cells, according to embodiments of the present invention.
Figure 5:
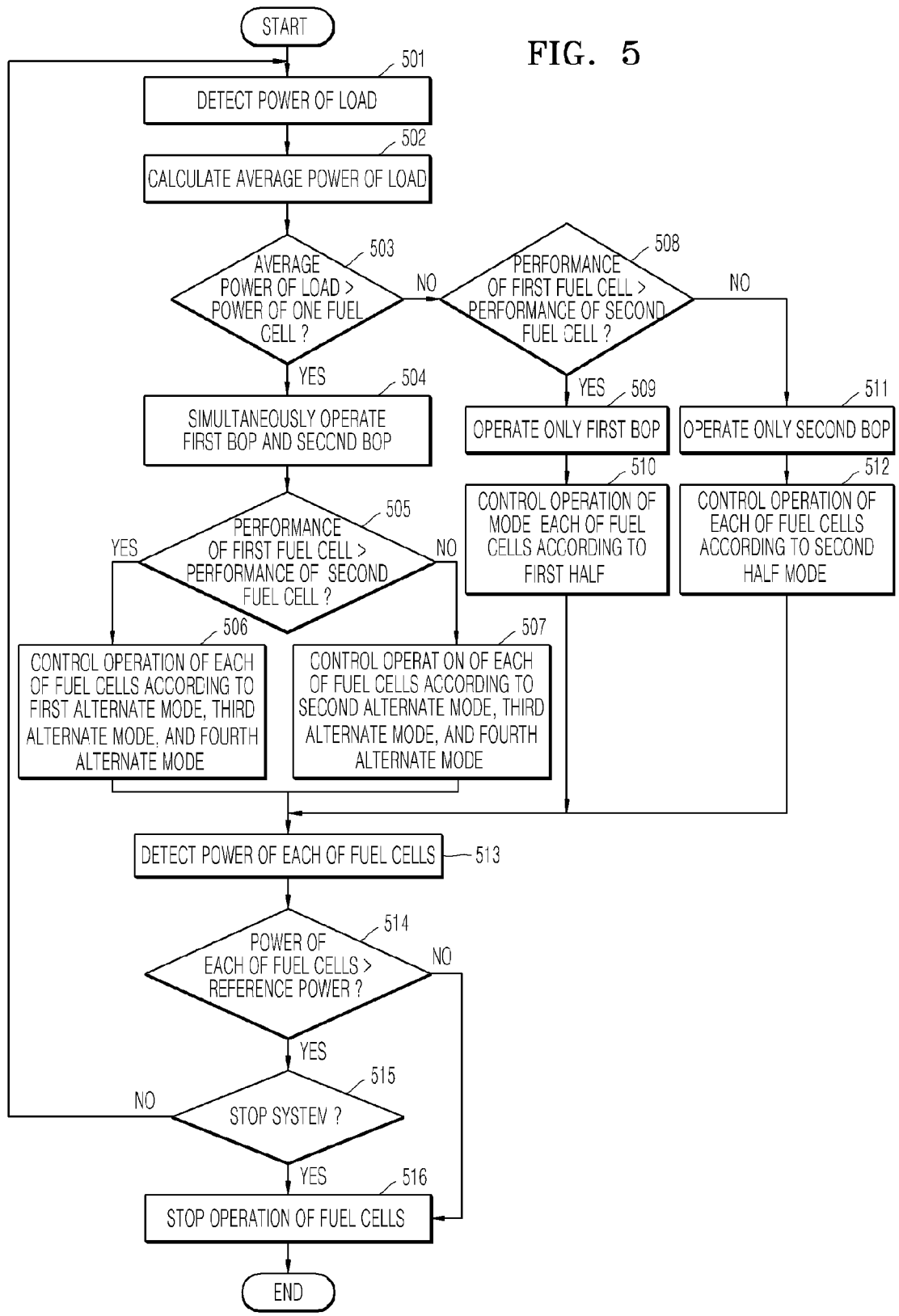

FIGS. 4 and 5 are flowcharts of methods of controlling an operation of a plurality of fuel cells, according to embodiments of the present invention. The method according to the embodiment of FIG. 4 controls the operation of the first fuel cell 11 and the second fuel cell 21 when the performance of the first fuel cell 11 and the second fuel cell 21 is high. The method according to the embodiment of FIG. 4 includes operations executed by the control unit 4 of FIG. 1 in sequential order. Thus, the aforementioned descriptions related to the control unit 4 of FIG. 1 also apply to the embodiment of FIG. 4 and are not provided here for convenience of explanation.

In operation 401, the control unit 4 detects power presently consumed in the load 10 from a present voltage and current of the load 10, which are measured by the third measuring unit 5. The power consumed in the load 10 is calculated by multiplying the present voltage across ends of the load 10 with the current presently flowing in the load 10. The present voltage across ends of the load 10 is measured by the first measuring unit 13.

In operation 402, the control unit 4 calculates an average power according to a sequence of present power measurements that are detected at selected intervals during a selected period. Here, the longer the selected period and the higher the number of the selected intervals, the reliability of the average power calculated by the control unit 4 is increased. However, the period and the number of intervals are determined according to conversion periods between the operational modes and a hardware function of the fuel cell system of FIG. 1.

In operation 403, the control unit 4 compares the average power calculated in operation 402 with an initial maximum power of either the first fuel cell 11 and/or the second fuel cell 21. Here, the initial maximum power of either the first fuel cell 11 and/or the second fuel cell 21 is a maximum output power of either the first fuel cell 11 or the second fuel cell 21 before the first fuel cell 11 and the second fuel cell 21 are operated. However, when only one of either the first fuel cell 11 or the second fuel cell 21 is operated, there is a relatively large difference between powers of the first fuel cell 11 and the second fuel cell 21. As a result of the comparison in operation 403, if the average power calculated in operation 402 is larger than the initial maximum power of either the first fuel cell 11 or the second fuel cell 21, the method proceeds to operation 404. Otherwise, the method proceeds to operation 406.

In operation 404, the control unit 4 simultaneously operates the first BOP 12 connected to the first fuel cell 11 and the second BOP 22 connected to the second fuel cell 21. By doing so, fuel, air, or the like are supplied to the first fuel cell 11 and the second fuel cell 21.

In operation 405, from among the various operational modes, the control unit 4 selects the full mode to operate both the first fuel cell 11 and the second fuel cell 21, and controls the operation of each of the first fuel cell 11 and the second fuel cell 21 according to the full mode.

In operation 406, the control unit 4 compares a performance of the first fuel cell 11 with a performance of the second fuel cell 21. For example, the control unit 4 compares the performances of the first fuel cell 11 and the second fuel cell 21 by comparing a working time of the first fuel cell 11 with a working time of the second fuel cell 21. In general, a performance of a fuel cell is degraded as a working time of the fuel cell increases. Thus, the working time of the fuel cell is used as indicator of the performance of the fuel cell. As a result of the comparison in operation 406, if the performance of the first fuel cell 11 exceeds the performance of the second fuel cell 21, the method proceeds to operation 407, otherwise, the method proceeds to operation 409.

In operation 407, the control unit 4 operates only the first BOP 12. Thus, fuel, air, or the like are supplied only to the first fuel cell 11.

In operation 408, from among the various operational modes for indicating the operation of either or both the first fuel cell 11 and the second fuel cell 21, the control unit 4 selects the first half mode and controls the operation of each of the first fuel cell 11 and the second fuel cell 21 according to the first half mode.

In operation 409, the control unit 4 does not operate the first BOP 12 connected to the first fuel cell 11 and instead operates the second BOP 22 connected to the second fuel cell 21. Thus, fuel, air, or the like are supplied only to the second fuel cell 21.

In operation 410, from among the various operational modes for indicating the operation of either or both the first fuel cell 11 and the second fuel cell 21, the control unit 4 sets the second half mode and controls the operation of each of the first fuel cell 11 and the second fuel cell 21 according to the second half mode.

In operation 411, the control unit 4 detects power that is presently output from each of the first fuel cell 11 and the second fuel cell 21 from a present voltage and current of the first fuel cell 11, which are measured by the first measuring unit 13, and a present voltage and current of the second fuel cell 21, which are measured by the second measuring unit 23. The power presently output from the first fuel cell 11 is calculated by multiplying the present voltage across the ends of the first fuel cell 11, which is measured by the first measuring unit 13, by the current present flowing in the first fuel cell 11. Similarly, the power presently output from the second fuel cell 21 is calculated by multiplying the current voltage at both ends of the second fuel cell 21, which is measured by the second measuring unit 23, by the current presently flowing in the second fuel cell 21.

In operation 412, the control unit 4 compares the power output from each of the first fuel cell 11 and the second fuel cell 21 that is detected in operation 411 with a reference power which is determined by a designer of the fuel cell system. As a result of the comparison, if the detected power output from each of the first fuel cell 11 and the second fuel cell 21 is larger than the reference power, the method proceeds to operation 413, otherwise, the method proceeds to operation 415. In the case where the detected power output from each of the first fuel cell 11 and the second fuel cell 21 is larger than the reference power, the performance of each of the first fuel cell 11 and the second fuel cell 21 is high. In the case where the detected power output from each of the first fuel cell 11 and the second fuel cell 21 is less than or equal to the reference power, the performance of each of the first fuel cell 11 and the second fuel cell 21 is low. Here, the reference power is determined by a designer of the fuel cell system, in consideration of a power of the first fuel cell 11 and the second fuel cell 21 when they initially start, power consumption of the load 10, or other similar characteristics.

In operation 413, the control unit 4 determines whether to stop an operation of the fuel cell system according to a condition such as a user command and the like. If the user commands the fuel cell system to stop the operation of the fuel cell system, the method proceeds to operation 414; otherwise, if the user commands the fuel cell system to continue the operation of the fuel cell system, the method returns to operation 401.

In operation 414, the control unit 4 stops the operation of the first fuel cell 11 and the second fuel cell 21, and stops the operation of each of the first BOP 12 connected to the first fuel cell 11 and the second BOP 22 connected to the second fuel cell 21.

In operation 415, the control unit 4 converts a method of controlling the operation of the first fuel cell 11 and the second fuel cell 21, both individually having the high performance, into a method of controlling the operation of the first fuel cell 11 and the second fuel cell 21 individually having the low performance. Operation 415 corresponds to a case in which the performance of each of the first fuel cell 11 and the second fuel cell 21 is low. After the converting, the method of FIG. 4 proceeds to operation 501 described with reference to FIG. 5.

FIG. 5 is a flowchart of the method of controlling the operation of the first fuel cell 11 and the second fuel cell 21, according to another embodiment of the present invention, when the performance of each of the first fuel cell 11 and the second fuel cell 21 is degraded. The method according to the embodiment of FIG. 5 includes operations that are processed by the control unit 4 of FIG. 1 in sequential order. Thus, the aforementioned descriptions related to the control unit 4 of FIG. 1 also apply to the embodiment of FIG. 5, and are not provided here for convenience of explanation.

In operation 501, the control unit 4 detects power presently consumed in the load 10 from a present voltage and current of the load 10, which are measured by the third measuring unit 5.

In operation 502, the control unit 4 calculates an average power with respect to powers that are detected at selected intervals during a selected period.

In operation 503, the control unit 4 compares the average power calculated in operation 502 with an initial maximum power of either the first fuel cell 11 or the second fuel cell 21. As a result of the comparison in operation 503, if the average power calculated in operation 502 is larger than the initial maximum power of either the first fuel cell 11 or the second fuel cell 21, the method proceeds to operation 504, otherwise, the method proceeds to operation 508.

In operation 504, the control unit 4 simultaneously operates the first BOP 12 connected to the first fuel cell 11 and the second BOP 22 connected to the second fuel cell 21. By doing so, fuel, air, or the like are supplied to the first fuel cell 11 and the second fuel cell 21.

In operation 505, the control unit 4 compares a performance of the first fuel cell 11 with a performance of the second fuel cell 21. As a result of the comparison in operation 505, if the performance of the first fuel cell 11 exceeds the performance of the second fuel cell 21, the method proceeds to operation 506; otherwise, the method proceeds to operation 507.

In operation 506, the control unit 4 selects the first alternate mode to alternately operate only the first fuel cell 11 and to operate both the first fuel cell 11 and the second fuel cell 21. Otherwise, in operation 506, the control unit 4 selects the third alternate mode to alternately operate only the first fuel cell 11 and only the second fuel cell 21. Alternatively, the control unit 4 selects the fourth alternate mode alternately operate both the first fuel cell 11 and the second fuel cell 21, only the first fuel cell 11, and only the second fuel cell 21. At this time, since the performance of the first fuel cell 11 exceeds the performance of the second fuel cell 21, the control unit 4 controls the first switch 32 and the second switch 33 in such a manner that the duty ratio of the first switch 32 is greater than the duty ratio of the second switch 33.

In operation 507, the control unit 4 selects the second alternate mode to alternately operate only the second fuel cell 21 and both the first fuel cell 11 and the second fuel cell 21. Alternatively, in operation 507, the control unit 4 selects the third alternate mode to alternately perform the operation of only the first fuel cell 11 and the operation of only the second fuel cell 21, or the control unit 4 selects the fourth alternate mode to alternately perform the operation of both the first fuel cell 11 and the second fuel cell 21, the operation of only the first fuel cell 11, and the operation of only the second fuel cell 21. At this time, since the performance of the second fuel cell 21 exceeds the performance of the first fuel cell 11, the control unit 4 controls the first switch 32 and the second switch 33 so that the duty ratio of the second switch 33 is greater than the duty ratio of the first switch 32.

In operation 508, the control unit 4 compares the performance of the first fuel cell 11 with the performance of the second fuel cell 21. As a result of the comparison in operation 508, if the performance of the first fuel cell 11 exceeds the performance of the second fuel cell 21, the method proceeds to operation 509, otherwise, the method proceeds to operation 511.

In operation 509, the control unit 4 operates only the first BOP 12 connected to the first fuel cell 11. Thus, fuel, air, or the like are supplied only to the first fuel cell 11.

In operation 510, the control unit 4 selects the first half mode indicating the operation of only the first fuel cell 11, and controls the operation of each of the first fuel cell 11 and the second fuel cell 21 according to the first half mode.

In operation 511, the control unit 4 does not operate the first BOP 12 and instead operates only the second BOP 22 connected to the second fuel cell 21. Thus, fuel, air, or the like are supplied only to the second fuel cell 21.

In operation 512, the control unit 4 selects the second half mode to operate only the second fuel cell 21, and controls the operation of each of the first fuel cell 11 and the second fuel cell 21 according to the second half mode.

In operation 513, the control unit 4 detects power that is presently output from each of the first fuel cell 11 and the second fuel cell 21 by measuring a present voltage and current of the first fuel cell 11 and the second fuel cell 21 by using the first measuring unit 13 and the second measuring unit 23, respectively.

In operation 514, the control unit 4 compares the power output from each of the first fuel cell 11 and the second fuel cell 21 that is detected in operation 513 with a reference power. As a result of the comparison, if the power output from each of the first fuel cell 11 and the second fuel cell 21 is larger than the reference power, the method proceeds to operation 515, otherwise, the method proceeds to operation 516. In the case where the power output from each of the first fuel cell 11 and the second fuel cell 21 is larger than the reference power, the performance of each of the first fuel cell 11 and the second fuel cell 21 is low, however, the method of controlling the operation of the first fuel cell 11 and the second fuel cell 21 is performed according to the present embodiment of FIG. 5. In the case where the power output from each of the first fuel cell 11 and the second fuel cell 21 is less than or equal to the reference power, the first fuel cell 11 and the second fuel cell 21 are no longer operational. Here, the reference power is determined by a designer of the fuel cell system, in consideration of a power of the first fuel cell 11 and the second fuel cell 21 after a selected period of time is elapsed from when the first fuel cell 11 and the second fuel cell 21 initially start, power consumption of the load 10, or other similar characteristics. In the present embodiment, the reference power of operation 514 is less than the reference power of operation 412, however, aspects of the present invention are not limited thereto.

In operation 515, the control unit 4 determines whether to stop an operation of the fuel cell system according to a condition such as a user command or the like. If the user commands the fuel cell system to stop the operation, the method proceeds to operation 516, otherwise, if the user commands the fuel cell system to continue the operation of the fuel cell system, the method returns to operation 501.

In operation 516, the control unit 4 stops the operation of each of the first fuel cell 11 and the second fuel cell 21, and stops the operation of each of the first BOP 12 and the second BOP 22.

According to the one or more embodiments, the operation of each of the first fuel cell 11 and the second fuel cell 21 are controlled according to the power consumed in the load 10 and the performance of each of the first fuel cell 11 and the second fuel cell 21. According to the power consumed in the load 10, the power of the first fuel cell 11 and the power of the second fuel cell 21 are simultaneously delivered to the load 10, or either the power of the first fuel cell 11 or the power of the second fuel cell 21 is delivered to the load 10. Therefore, power conversion efficiencies of the first fuel cell 11 and the second fuel cell 21 are increased. Also, by controlling the working time of each of the first fuel cell 11 and the second fuel cell 21 according to the performance of each of the first fuel cell 11 and the second fuel cell 21, a load is distributed according to the performance of each of the first fuel cell 11 and the second fuel cell 21, and considerable performance degradation of the first fuel cell 11 and the second fuel cell 21 is prevented. Thus, the lifetime of the first fuel cell 11 and the second fuel cell 21 is extended.

The control unit 4 is either embodied as an array including a plurality of logic gates or is embodied as a combination of a general microprocessor and a recording medium having recorded thereon a program to be executed by the microprocessor. However, aspects of the present invention are not limited thereto and the control unit 4 may be embodied as other similar hardware elements. In the case of the combination, the methods according to the embodiments of FIGS. 4 and 5 are written as computer programs and are implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc. However, aspects of the present invention are not limited thereto and other computer readable recording medium may be used.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A fuel cell system, comprising:
a plurality of fuel cells;
a control unit controlling an operation of each of the plurality of fuel cells according to a power consumed in a load and a performance of the plurality of fuel cells; and
a converter converting a power output by at least one of the plurality of fuel cells into a power according to the control of the control unit, wherein the converter includes:

a transformer having:
a plurality of primary windings; and
a plurality of secondary windings; and
a direct current (DC) to direct current (DC) converter,
wherein one of the plurality of primary windings is connected to one of the plurality of fuel cells, another one of the plurality of primary windings is connected to another one of the plurality of fuel cells, and the plurality of secondary windings of the transformer are commonly connected to the DC-DC converter.

2. A fuel cell system, comprising:
a plurality of fuel cells;
a plurality of a balance of plants (BOPs) providing fuel and air to the plurality of fuel cells;
a control unit selecting an operational mode controlling an operation of the plurality of fuel cells and the plurality of BOPs according to a power consumed in a load and a performance of the plurality of fuel cells; and
a converter, wherein the converter includes:
a transformer, and
a direct current (DC) to direct current (DC) converter, wherein the transformer includes a plurality of windings, wherein a first plurality of the plurality of windings are connected to the plurality of fuel cells and a second plurality of the plurality of windings are commonly connected to the DC-DC converter.

3. The fuel cell system of claim 2, wherein the control unit selects the operational mode to be one of a full mode, a half mode or an alternate mode.

4. The fuel cell system of claim 3, wherein the full mode comprises the control unit operating all of the plurality of fuel cells and all of the plurality of BOPs according to a plurality of pulse trains output from the control unit to a plurality of switches, respectively, in order to periodically open and close the plurality of switches respectively that are connecting the plurality of fuel cells to a converter converting power output by the plurality of fuel cells into a power provided to a load.

5. The fuel cell system of claim 4, wherein the plurality of pulse trains have a same duty ratio and have a phase difference less than 360 degrees divided by an amount of the plurality of fuel cells.

6. The fuel cell system of claim 3, wherein the half mode comprises the control unit operating a one of the plurality of fuel cells and a one of the plurality of BOPs according to a pulse train output from the control unit to a switch in order to periodically open and close the switch that is connecting the one of the plurality of fuel cells to a converter converting power output by the one of the plurality of fuel cells into a power provided to a load.

7. The fuel cell system of claim 3, wherein the alternate mode comprises the control unit alternately operating the full mode and the half mode.

* * * * *